Figures 1, 2:
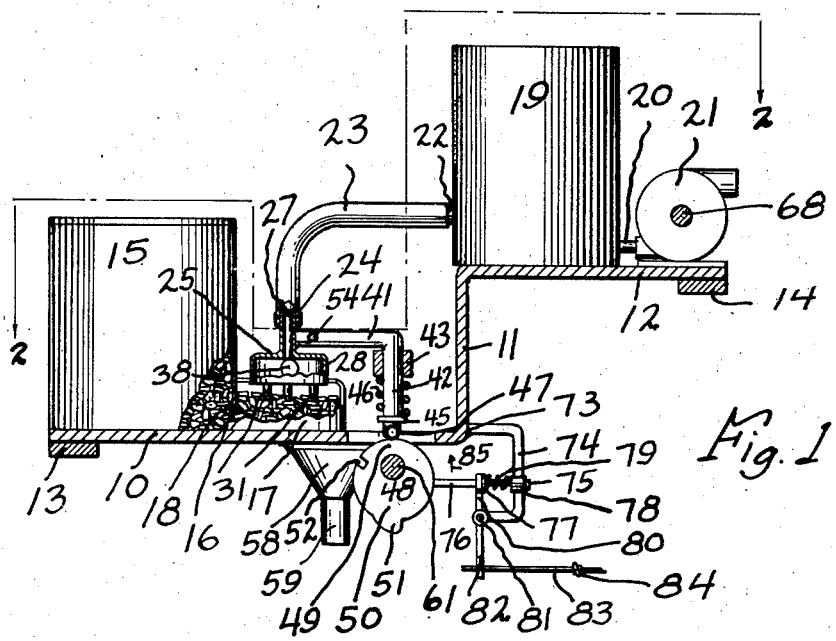

Dec. 7, 1948.    R. D. PUTMAN ET AL    2,455,701
SEED COUNTING AND SELECTING DEVICE
Filed June 18, 1945    2 Sheets-Sheet 1

INVENTORS
Robert D. Putman
Carleton M. Magoun
BY
Sam J. Slotky
ATTORNEY

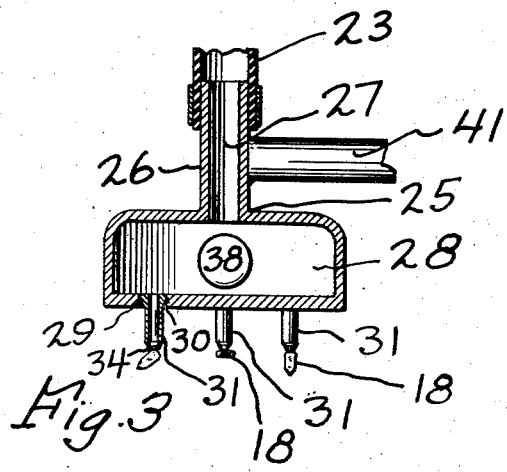
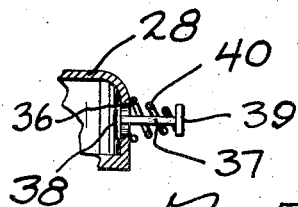
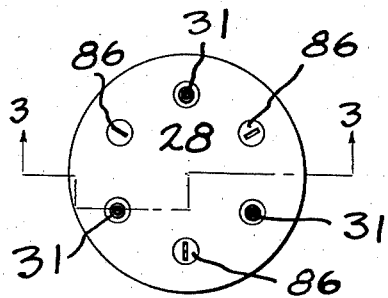
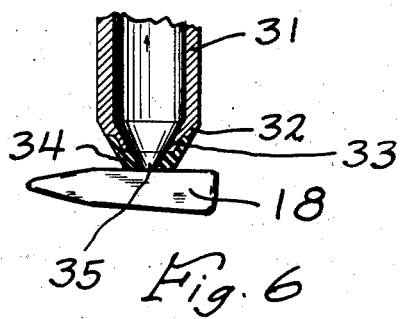

Patented Dec. 7, 1948

2,455,701

UNITED STATES PATENT OFFICE 2,455,701

SEED COUNTING AND SELECTING DEVICE

Robert D. Putman and Carleton M. Magoun, Sioux City, Iowa

Application June 18, 1945, Serial No. 600,098

2 Claims. (Cl. 111—38)

Our invention pertains to a device for accurately counting and selecting a predetermined number of seeds.

An object of our invention is to provide a device of this character which will select any given number of seeds, whether such seeds be irregular in shape or not, and to transfer such seeds to any desired location and then release the same for various purposes such as planting, regardless of the seed size.

A further object of our invention is to provide an automatic arrangement for performing the above operation.

A further object of our invention is to provide a vacuum effect through a series of comparatively attenuated tubes or such members to allow the insertion of a seed gathering member into a mass of seeds.

A further object of our invention is to provide an automatic arrangement which can be properly synchronized with a planting arrangement.

A further object of our invention is to provide the above mentioned objects in a simple mechanical structure and which can be manufactured at a reasonable cost.

With these and other objects in view, our invention consists in the construction, arrangement, and combination of the various parts of our device, whereby the objects contemplated are attained, as hereinafter more fully set forth, pointed out in our claims, and illustrated in the accompanying drawings, in which:

Figure 1 is a side elevation of the arrangement taken substantially along the lines 1—1 of Figure 2, Figure 2 is a plan view taken substantially along the lines 2—2 of Figure 1, Figure 3 is an enlarged detail of the vacuum head, and taken along the lines 3—3 of Figure 4, Figure 4 is a bottom view of the vacuum head, Figure 5 is a detail of the vacuum head air inlet, and Figure 6 is an enlarged detail of the nozzle end of one of the suction tubes.

Our invention contemplates particularly, the provision of a method for selecting and holding a predetermined number of seeds of any shape or substantial size from a mass of such seeds, and thence holding such seeds and transferring the same to a necessary place of deposit such as in a planter or the like, which arrangement is fully automatic, requiring no attention by an operator.

We have used the character 10 to designate a platform which extends into the portions 11 and 12 which platform is suitably attached to brackets 13 and 14 which brackets can be attached to any device, and in particular to a seed planting arrangement which is ordinarily drawn from a tractor. Attached to the platform 10 is a substantially enlarged cylindrical seed container 15 which includes a lower opening at 16 which opening communicates with the auxiliary smaller chamber 17, the nature and size of the opening at 16 permitting the seeds such as 18 to gravitate into the vessel 17 and at the same time maintain a substantially constant level, such operation being permitted due to the nature of the seed itself and the opening. Attached to the platform portion 12 is a vacuum chamber 19 which is connected through the pipe 20 to a rotary vacuum pump 21. Communicating with the chamber 19 through the pipe 22 is a flexible tube 23 which is securely attached at 24 to a vacuum head member 25 which includes a vertical hollow neck 26, the tube 23 being attached to such neck. The neck 26 includes the hollow cylindrical opening 27 passing therethrough which opening communicates with the enlarged cylindrical head member 28 which head member includes a series of threaded openings 29 in which are threadably received the threaded portions 30 of the attenuated tubes 31 which tubes 31 terminate in the conical ends 32.

Securely attached about the portions 33 of the member 32 are the rubber tips 34 such tips also being of a substantial cone shape to provide a restricted nozzle opening at 35 (see Figure 6).

Located at the other side of the chamber 28 is an opening 36 (see Figure 5) in which is received the pin 37 which is attached to the valve 38, and attached at the other end of the pin 37 is the abutment member 39, there also being provided a compression spring 40 positioned between the valve 38 and the member 39 with such spring being attached to both members to support the valve. Extending from the neck 26 is an arm 41 which terminates in the vertical slidable plunger 42 which is slidably received within a bearing 43 which bearing is attached to a bracket 44. Attached to the member 42 is a collar 45, and a compression spring 46 receives the member 42 and is positioned between the bearing 43 and the collar 45.

Attached to the lower end of the member 42 is a roller member 47 which extends at right angles to the member 42 and is adapted to constantly abut against the cam member 48, the cam member including the smaller portion 49 and the eccentric portion 50. Extending from the portion 50 of the cam is a further cam portion 51, and recessed within the cam 50 is the indent 52. Attached at 53 to the arm 41 is a tension spring 54 which is attached at 55 to the post 56 which is attached to the platform 10. Passing through the platform 10 is an opening 57 which communicates with a funnel 58 having the open tubular end 59. Attached to the bracket 44 is an extending abutment member 60. The cam 48 is attached to a shaft 61 which is journalled within the bearing 62 and interposed between the shaft 61 and the further shaft portion 63 is an overrunning clutch member 64.

Attached to the shaft 63 is a pulley 65 about which passes the belt 66 which drives the small pulley 67 which is attached to the shaft 68 which is journalled at 69, the shaft 68 being adapted to rotate the pumping mechanism within the pump 21. Attached to the outer end of the shaft 63 is an enlarged ring gear 70, which is meshed with the still larger gear 71 which gear 71 can be attached inside of the wheel 72, the wheel 72 being one of the wheels of the planter. Attached at 73 to the portion of the platform 11 is a further bracket 74 through which is slidably received the pin 75 which pin is attached to the locking member 76, the collar 77 being attached to the pin 75 and the bracket including a portion 78 between which portion and the collar 77 is located the compression spring 79. A fork member 80 bears against the collar 77 and is pivoted at 81 and communicates with a laterally positioned member 82 through which can pass a check row wire 83 having the usual knots 84 attached thereto.

Now that the structure of our device has been explained, we shall explain the operation thereof.

The seed which is carried in the main chamber 15 will gravitate to a normal level within the auxiliary chamber 17, and as fast as it is used. The entire arrangement as explained heretofore can be attached to a standard planter etc. It will be noted from the meshed engagement of the gears 70 and 71 that the pump 21 will evacuate the air in the reservoir 19 constantly during forward motion of the planter due to the rotation of the wheel 72. The tendency is thus for a constant vacuum or partial vacuum to be formed in the chamber 19 which similarly causes a vacuum to be applied through the tube 23 and through the head portion 28 and also through the small tubes 31. This vacuum or suction therefore has the tendency of causing seeds or any similar particles to be firmly held against the tips 34 due to the excess of air pressure beneath the seeds. The opening at 35 is made purposely rather small so that contact of the nozzle end with any portion of the seed will cause a firm retention thereof. The rubber tip 34 also provides a resilient gasket at this point to hold the suction. The tubes 31 are adapted to normally dip slightly beneath the normal level of the seeds in the vessel 17 and as shown in Figure 1. As the shafts 63 and 61 drive the cam 48, it will rotate in the direction of the arrow 85 and due to the eccentricity of the portion 50 the cam will cause the roller member 47 to rise, carrying the plunger 42 upwardly as well as the head 28.

Figure 3 illustrates seeds such as corn being held against the nozzle ends, such seeds tending to be drawn toward these ends even though they may originally be at a slight distance from the same, and as the head moves upwardly out of the chamber 17 only one seed will be attracted or drawn to each nozzle opening 35. Figure 3 illustrates also the fact that the seed is held regardless of its position due to the above mentioned features. As the cam rotates upwardly the head 28 is forced upwardly and out of the vessel 17. As soon as the protuberance 51 on the cam strikes against the roller 47, and due to the fact that the plunger 42 has traveled to its maximum upper position this protuberance 51 will swing the member 47 toward the left as viewed in Figure 2 carrying the entire head 28 to the dotted position as shown in Figure 2. The head is then set for the releasing or depositing operation, and as soon as the abutment member 39 strikes the member 60, the valve 38 will be forced inwardly allowing a considerable charge of air under normal pressure into the head member 28, destroying the vacuum therein which will allow the seeds 18 to drop into the funnel 58 and into the tube 59, and thence downwardly into the ground, or wherever it is desired to deposit the same.

Immediately after this operation the protuberance 51 will have passed beyond the roller member 47 whereby the spring 54 will pull the arrangement back to its normal position again ready for the next operation. It will be noted that as soon as the head 28 is released from abutting engagement with the portion 60 that the vacuum will be quickly reestablished, and it will also be noted that since the chamber 19 is of considerable volume compared to the head 28, that there will correspondingly be an excess of vacuum or suction at all times in the head 28. This operation will thereby be maintained constantly, the mechanism passing through the aforesaid cycles, first picking up the seed, and only the number of seeds as required, and thence depositing the same. The various figures illustrate the device for picking up three seeds, although the head member 28 can be employed to pick up any desired number, for instance from one to six seeds as shown in Figure 4, with the blanking plugs 86 being employed when it is desired to blank out certain of the openings.

In many cases such as in a check row planter it is desired to operate the seed selecting arrangement at certain intervals, or when the knots 84 on the check wire 83 will trip the mechanism. In this type of apparatus the locking tongue 76 will be inserted within the indent 52 of the cam 48 thereby locking the cam against rotation, the overrunning clutch 64 causing the shaft 61 to remain stationary even though the shaft 63 is rotating. As soon as the knot 84 passes through the portion 82 however, it will cause the fork 80 to move the pin 75 toward the right as viewed in Figure 1 thereby releasing the tongue 76 momentarily from the indent 52. This allows the cam 48 to continue to rotate with the aforesaid action taking place. This action will be maintained with the tongue 76 bearing against the cam surfaces without locking the cam however until the indent 52 is again reached. This then, causes a uniform spacing of the deposited seed, it only being necessary to maintain one revolution of the cam 48 at a slightly lesser rate than the interval set up by the knots 84. The overrunning clutch 64 therefore will cause movement of the shaft 61 at all times when the tongue 76 is out of engagement with the indent 52.

It will be observed that the ratio of the gears 70 and 71 permit a relatively slow movement of the cam 48 while the ratio of the constantly driven pulley 65 and the small pulley 67 provides a rapidly rotating pump 21, so that the constant vacuum is insured. It should be realized that our device will pertain not only to seed planters, but in principle will apply to other arrangements wherein it is necessary to withdraw a certain number of seeds and deposit the same, and in uniform relation.

The above-described device does not therefore require a previous grading of the seed, since it will plant the seed in this manner regardless of size, whereas heretofore planting devices have required grading as to size so that the planting mechanism would operate properly. This device therefore allows the farmer or operator to perform the planting or similar operation without pre-grading.

It will now be seen that we have provided all of the various objects mentioned in our invention with various other advantages being readily apparent.

Some changes may be made in the construction and arrangement of the parts of our invention without departing from the real spirit and purpose of our invention, and it is our intention to cover by our claims any modified forms of structure or use of mechanical equivalents which may be reasonably included within their scope.

We claim as our invention:

1. A seed counting and selecting device comprising a vacuum creating source, a vacuum head connected thereto, said head including a plurality of attenuated tubes having end openings, whereby suction applied through said openings will cause seeds to adhere thereto, means for automatically moving said head and said tubes to a position adjacent to seed attaching position including an eccentric cam member, said head having an extension whereby abutment thereagainst by rotation of the cam member will elevate said head, means for swinging said head to a depositing position including an arm attached to said extension, said cam including a protuberant portion adapted to swing said arm, means for releasing the vacuum in said head when said head is swung to its depositing position including a valve member in said head, means for opening said valve member to cause air pressure to flow in said head when said head is in such depositing position.

2. A seed counting and selecting device comprising a vacuum creating source, a vacuum head connected thereto, said head including a plurality of attenuated tubes having end openings, whereby suction applied through said openings will cause seeds to adhere thereto, means for automatically moving said head and said tubes to a position adjacent to seed attaching position including an eccentric cam member, said head having an extension whereby abutment thereagainst by rotation of the cam member will elevate said head, means for swinging said head to a depositing position including an arm attached to said extension, said cam including a protuberant portion adapted to swing said arm, means for releasing the vacuum in said head when said head is swung to its depositing position including a valve member in said head, means for opening said valve member to cause air pressure to flow in said head when said head is in such depositing position, means for synchronously causing operation of said device from a planter including a locking tongue, said cam having an indent for receiving said tongue to lock said cam against movement until release of said tongue, said tongue adapted to be released by a check wire.

ROBERT D. PUTMAN.
CARLETON M. MAGOUN.

REFERENCES CITED

The following references are of record in the file of this patent:

UNITED STATES PATENTS

| Number | Name | Date |
|---|---|---|
| 792,958 | Bagger | June 20, 1905 |